US006295559B1

(12) United States Patent
Emens et al.

(10) Patent No.: US 6,295,559 B1
(45) Date of Patent: Sep. 25, 2001

(54) RATING HYPERMEDIA FOR OBJECTIONABLE CONTENT

(75) Inventors: Michael Lawrence Emens, San Jose; Reiner Kraft, Gilroy; Neelakantan Sundaresan, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,294

(22) Filed: Aug. 26, 1999

(51) Int. Cl.$^7$ .................................................. G06F 15/173
(52) U.S. Cl. .......................... 709/225; 709/203; 709/217; 709/300; 707/1; 707/10
(58) Field of Search .................................... 709/225, 300, 709/203, 217; 707/1, 10

(56) References Cited

U.S. PATENT DOCUMENTS

| 5,195,135 | 3/1993 | Palmer ..................................... 380/20 |
| 5,377,354 | 12/1994 | Scannell et al. ....................... 395/650 |
| 5,619,648 | 4/1997 | Canale et al. .................... 395/200.01 |
| 5,678,041 | 10/1997 | Baker et al. ........................... 395/609 |
| 5,691,972 | * 11/1997 | Tsuga et al. ......................... 369/275.3 |
| 5,706,507 | 1/1998 | Schloss ................................. 395/615 |
| 5,784,564 | 7/1998 | Camaisa et al. ................. 395/200.54 |
| 5,832,212 | 11/1998 | Cragun et al. ................... 395/188.01 |
| 5,835,576 | 11/1998 | Katz ..................................... 379/93.13 |
| 5,835,722 | 11/1998 | Bradshaw et al. .............. 395/200.55 |
| 5,867,799 | * 2/1999 | Lang et al. ................................ 707/1 |
| 5,878,233 | 3/1999 | Schloss ............................ 395/200.55 |
| 5,911,043 | * 6/1999 | Duffy et al. ........................... 709/203 |
| 5,956,716 | * 9/1999 | Kenner et al. .......................... 707/10 |
| 5,961,591 | * 10/1999 | Jones et al. ........................... 709/217 |
| 5,974,444 | * 10/1999 | Konrad ................................. 709/203 |
| 5,983,214 | * 11/1999 | Lang et al. ............................... 707/1 |
| 6,003,030 | * 12/1999 | Kenner et al. .......................... 707/10 |
| 6,038,610 | * 3/2000 | Belfiore et al. ....................... 709/300 |
| 6,072,483 | * 6/2000 | Rosin et al. ........................... 345/335 |

FOREIGN PATENT DOCUMENTS

| 860785 | 8/1998 | (EP) ............................... G06F/17/30 |
| 9841913 | 9/1998 | (WO) . |

\* cited by examiner

Primary Examiner—Ayaz Sheikh
Assistant Examiner—Frantz B. Jean
(74) Attorney, Agent, or Firm—Lumen Intellectual Property Services (57) ABSTRACT

A method for providing rated hypermedia content, in which the rating represents degrees of objectionable content, includes four steps: generating raw hypermedia content from a set of units containing data from external data files, obtaining content rating vectors associated with the external data files, deriving a composite content rating vector for the raw hypermedia content from the content rating vectors, and storing the composite content rating vector in the raw hypermedia content to produce rated hypermedia content. Preferably, the raw hypermedia content is a raw search result page created automatically by a search engine in response to a query from a client machine. A rated search result page is generated and transmitted to the client machine over a computer network. The units may represent external data files, preferably other Web pages, and the content rating vectors represent the degrees of objectionable content of the Web pages. Content rating vectors are obtained directly from the external data files or by rating them automatically. The external data files may be of any type, including audio, text, image, or a combination. The composite content rating vector comprises a set of components, and each component is derived from corresponding components of the content rating vectors. Each component may equal the maximum value of the corresponding components of the content rating vectors.

13 Claims, 6 Drawing Sheets

Prior Art

*FIG. 8*

RATING HYPERMEDIA FOR OBJECTIONABLE CONTENT

CROSS-REFERENCE TO RELATED APPLICATIONS

This application is related to copending patent application, "Automatic Rating and Filtering of Data Files for Objectionable Content," filed Aug. 16, 1999, application Ser. No. 09/374,644 which is herein incorporated by reference.

FIELD OF THE INVENTION

This invention relates generally to methods for rating hypermedia for objectionable content. More particularly, it relates to methods for rating a search result page using ratings of units within the page.

BACKGROUND ART

The astronomical growth of the World Wide Web in the last decade has put a wide variety of information at the fingertips of anyone with access to a computer connected to the internet. In particular, parents and teachers have found the internet to be a rich educational tool for children, allowing them to conduct research that would in the past have either been impossible or taken far too long to be feasible. In addition to valuable information, however, children also have access to offensive or inappropriate information, including violence, pornography, and hate-motivated speech. Because the World Wide Web is inherently a forum for unrestricted content from any source, censoring material that some find objectionable is an unacceptable solution. The browser determines whether or not to display a document by applying a set of user-specified criteria. For example, the browser may have access to a list of excluded sites or included sites, provided by a commercial service or a parent or educator. Users can also choose to receive documents only through a Web proxy server, which compares the requested document with an exclusion or inclusion list before sending it to the client computer. Another method, developed by the Recreational Software Advisory Council (RSAC), provides a detailed rating system; ratings are stored by the author or content provider in a specific format with a document's meta-information. Current Web browsers can extract the ratings and compare them with user-specified content levels to determine whether or not to display the document. The user can also set the browser not to display pages without a rating.

One problem with all of the currently-existing solutions is that they cannot keep up with the rate at which Web pages are being added or modified. Currently, both rating sites and adding sites to exclusion lists require human labor that is subjective and time consuming. Even if it were possible to evaluate every new site, there is still no way to apply present methods to dynamically created documents, for example, search result pages. Search engines receive a user query, search an index to find applicable documents, and create a search result page listing a number of the located documents. The search result page typically includes a title and short abstract or extract, along with the Uniform Resource Locator (URL), for each retrieved document. The search result page itself might have objectionable content in the document summary information, or it might contain hyperlinks to sites with objectionable content. One way to address this problem is for browsers not to display search result pages at all. Without search engines, though, internet research is significantly limited.

AltaVista™, a well-known search engine, has developed a Family Filter™ in cooperation with SurfWatch™, a company that pioneered the concept of filtering objectionable content on the Web. The filter can be applied to either audio, image, and video, or to all content, including text. When the filter is turned on, documents that were previously classified as objectionable are prevented from appearing in the search results. Objectionable content falls into one of five categories: Drugs/Alcohol/Tobacco, Gambling, Hate Speech, Sexually Explicit, and Violence. A significant drawback to the Family Filter™ is its lack of flexibility and user input in blocking access to sites. For example, some parents may want to protect their children from exposure to hate speech, but not from other types of offensive material. Different users also have different standards for objectionable content within each category. The Family Filter™ has no means for accommodating the broad variety of user requirements.

There is a need, therefore, for a method for rating automatically-generated documents that allows for user flexibility in the definition of objectionable content.

OBJECTS AND ADVANTAGES

Accordingly, it is a primary object of the present invention to provide a method for rating a search result page for objectionable content.

It is a further object of the invention to provide a method that allows for user flexibility in defining objectionable content.

It is an additional object of the invention to provide a method that can be used for documents containing text, audio, or image files.

It is another object of the present invention to provide an automatic rating method that works with existing manual rating methods and therefore requires minimal system changes.

SUMMARY

These objects and advantages are attained by a computer-implemented method for providing rated hypermedia content, in which the rating represents the degree to which the content is objectionable. The method includes four steps: generating raw hypermedia content from a set of units, obtaining content rating vectors associated with each unit, deriving a composite content rating vector for the raw hypermedia content from the content rating vectors, and storing the composite content rating vector in the raw hypermedia content to produce the rated hypermedia content. The units contain data from a set of external data files, and the content rating vectors represent the degrees to which the external data files are objectionable. For example, the units might contain a brief extract from and hyperlink to the external data file. The content rating vectors may be obtained directly from the external files, for example, in the files' meta-information, or they may be generated automatically. The external data files may be of any type, including text, audio, or image.

Also included in the present invention is a method for providing a rated search result page to a client machine. First, a raw search result page is generated by a search engine in response to a search query from the client machine. The raw search result page consists of a set of units with associated content rating vectors, which represent degrees of objectionable content. Content rating vectors are obtained and used in deriving a composite content rating vector for the raw search result page. The composite content rating vector is stored in the raw search result page to produce the rated search result page, and the rated search result page is transmitted over a computer network to the client machine.

Preferably, the units represent data files or Web pages. For example, a unit may include a title, summary, first few words, or URL for a Web page matching the search query. The data files can be of any type, including text, audio, or image. Content rating vectors are obtained either directly from the data files, if they have been previously rated, or by automatically rating the data files for objectionable content. Content rating vectors then represent degrees to which the data files are objectionable.

The composite content rating vector comprises a set of components, and each component is derived from corresponding components of the content rating vectors associated with the units. In one embodiment, each component of the composite content rating vector is equal to the maximum value of the corresponding components of the content rating vectors. This is especially useful when the units represent data files.

The composite content rating vector can be extracted and read by the client machine. For example, the composite content rating vector stored in a search result page can be read by a Web browser at a client computer. Depending on preset user limit values defining objectionable content, the browser displays the search result page, or displays a message indicating why the search result page cannot be viewed.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
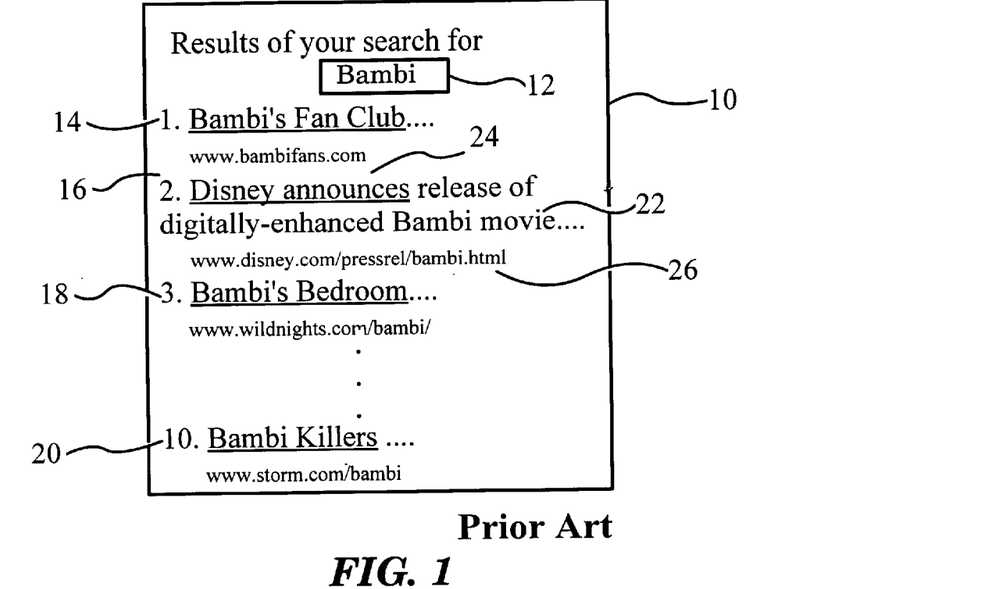
FIG. 1 is a schematic diagram of a search result page as known in the prior art.

FIG. 1 shows a search result page 10 as known in the prior art. To obtain a search result page, a user accesses a search engine Web site through a browser at a client computer and enters a query. The search engine automatically generates the search result page in response to the user query. Search result page 10 contains a user query 12 ("Bambi," in the example of FIG. 1) and search results 14, 16, 18, and 20. Search results 14, 16, 18, and 20 represent Web sites matching user query 12, a simple keyword search. Each search result contains summary information 22, which may include a title and short abstract or extract from the related Web site, an underlined, hyperlinked portion 24, which causes the browser to display the related site when clicked, and the Uniform Resource Locator (URL) 26 of the related site. Most search engines allow the user to choose to search audio, image, or video, and the resulting search results contain links to Web pages containing the located audio, image, or video files. Search result page 10 usually contains other information not relevant to the present invention, including advertising and other links. In general, the search result set contains more sites than fit on one page, and the user must request subsequent pages.

Search result page 10 clearly shows the problem motivating the present invention. Suppose a child is interested in learning about the animated Disney deer character, Bambi, but does not know that Bambi is a woman's name commonly used in pornography. Of the results on search result page 10, results 14 and 16 might be of interest. Search result 18, however, contains sexually explicit photographs; search result 20 is an urban hunting parody, which may not be appropriate for younger users. While not shown in FIG. 1, the summary material for these search results may itself contain inappropriate language or images. A parent might want to block access not only to the search result sites, but also to the summary information contained on search result page 10.

The present invention solves the above problem with a computer-implemented method for providing an automatically-generated rated search result page, containing a rating for objectionable content. The rating can then be read by a browser using existing technology to determine, based on preset user content settings, whether or not the search result page will be shown to the user. A key feature of the invention is that the rating method is automatic, and can be easily integrated into the search engine's current procedures for generating search result pages.

Figure 2:
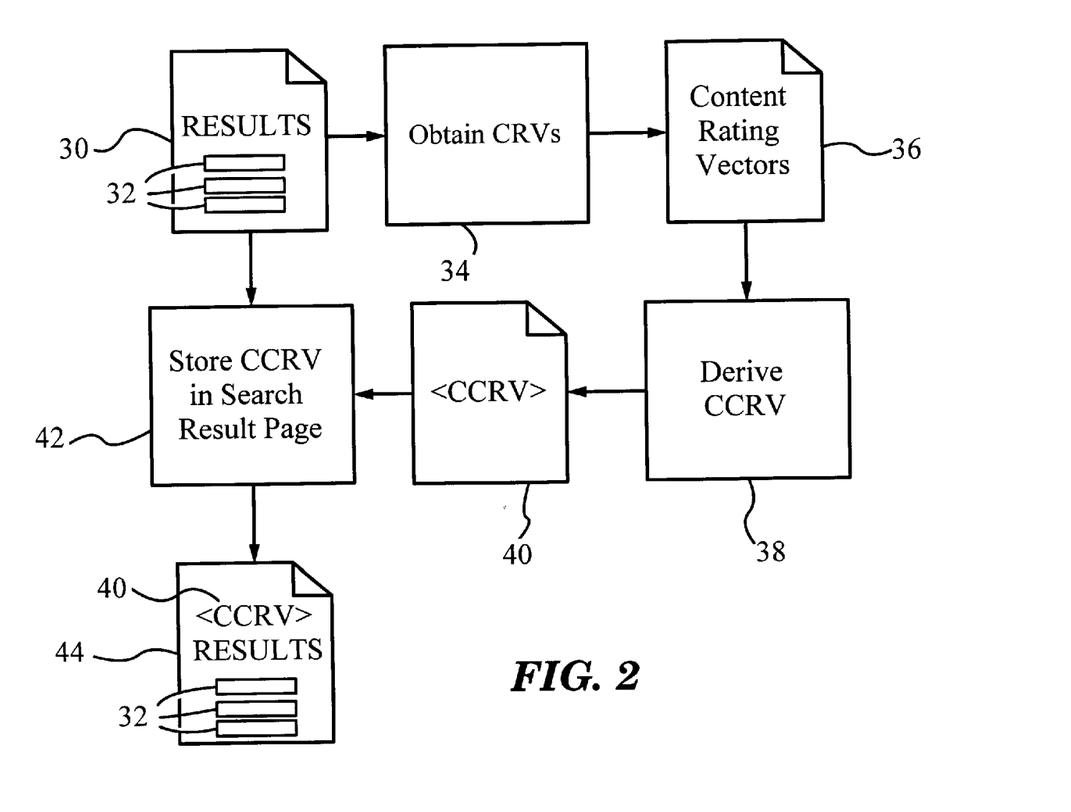
FIG. 2 is a block diagram of a method of the present invention for rating search result pages.

A preferred embodiment of the invention is shown in FIG. 2. A rated search result page (SRP) 44 will be created from a raw search result page 30 containing a set of units 32. First, raw search result page 30 is generated from a search query (not shown). In step 34, content rating vectors (CRVs) 36 associated with units 32 are obtained. CRVs 36 represent degrees of objectionable content. Next, a composite content rating vector (CCRV) 40 is derived from CRVs 36 in step 38. In step 42, CCRV 40 is stored in raw search result page 30 to produce rated search result page 44, formed from and containing units 32. Finally, rated SRP 44 is transmitted over a computer network to the client machine that submitted the search query.

Figure 3:
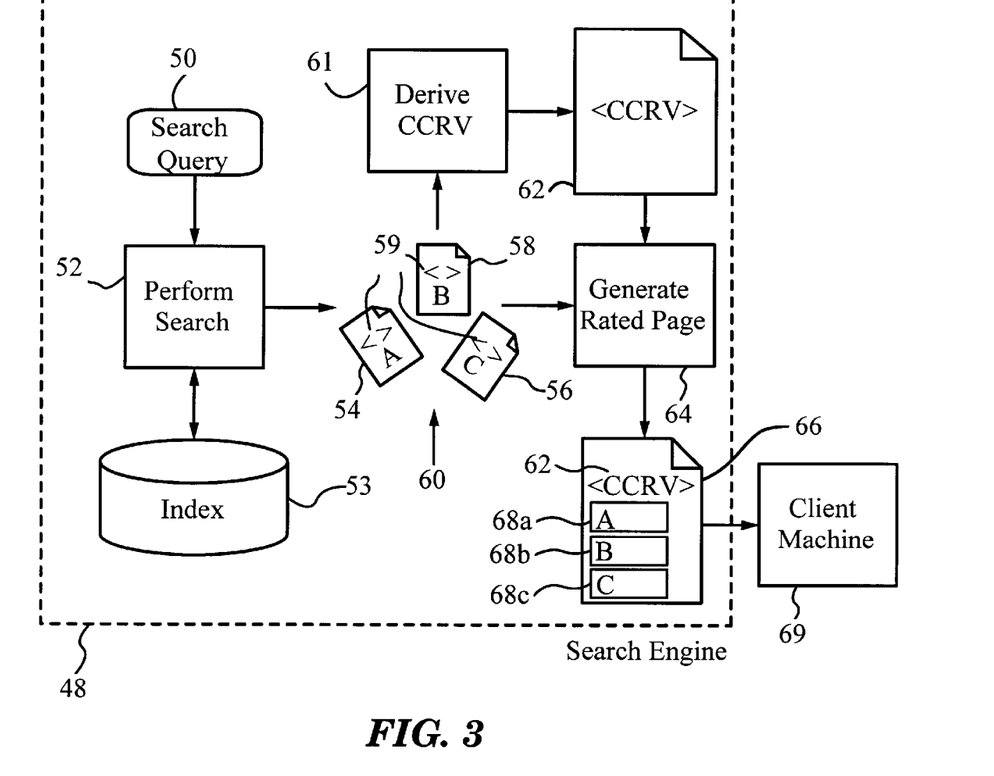
FIG. 3 is a block diagram of one embodiment of the method of FIG. 2.

Preferably, units 32 represent data files, and CRVs 36 represent degrees to which the data files are objectionable. For example, search result 14 in SRP 10 of FIG. 1 is a unit that represents the Bambi Fan Club Web site. It might also represent an audio or image file contained in a different Web site. FIG. 3 shows an embodiment of the method in which the units represent data files. The steps of FIG. 3 occur within a search engine 48. Upon receiving a search query 50, search engine 48 performs a search (step 52) of its index 53. Index 53 contains Web site meta-information, including name, keywords, URL, content rating vectors, and other relevant information. Index creation is discussed in more detail below. Search engine 48 locates entries in index 53 for data files 54, 56, and 58 that match search query 50 to create a search result set 60, which can be used to generate a raw search result page (not shown). Data files 54, 56, and 58 have content rating vectors 59 (shown as "<>" in FIG. 3) that represent degrees to which the data files are objectionable. Data files 54, 56, and 58 can be any type of file, including text, audio, image, video, or a combination of types.

In step 61, search engine 48 derives a CCRV 62 from CRVs 59. Any suitable method may be used to derive CCRV 62; a preferred method will be discussed below. In step 64, search engine 48 produces a rated search result page 66 from search result set 60 and CCRV 62. Rated SRP 66 contains CCRV 62 and units 68a, 68b, and 68c. Each unit represents a data file; for example, unit 68a represents data file 54. CRVs 59 are associated with units 68, but do not rate the units themselves. Finally, search engine 48 transmits rated SRP 66 to a client machine 69 over a computer network.

A key element of search engine 48 is its index 53. Associated with search engine 48 is a computer that continually "crawls" the Web, searching for new or modified Web sites to add to index 53. For each indexed Web site, the computer stores various pieces of meta-information, for example, title, summary information, keywords, and URL. For the present invention, the computer also stores a page's content rating vector. In some cases, a Web site to be indexed already contains a CRV that was stored by the site's creator, and the computer simply extracts that CRV to add to the index. In this case, the CRV is obtained from the data file itself.

Figure 4:
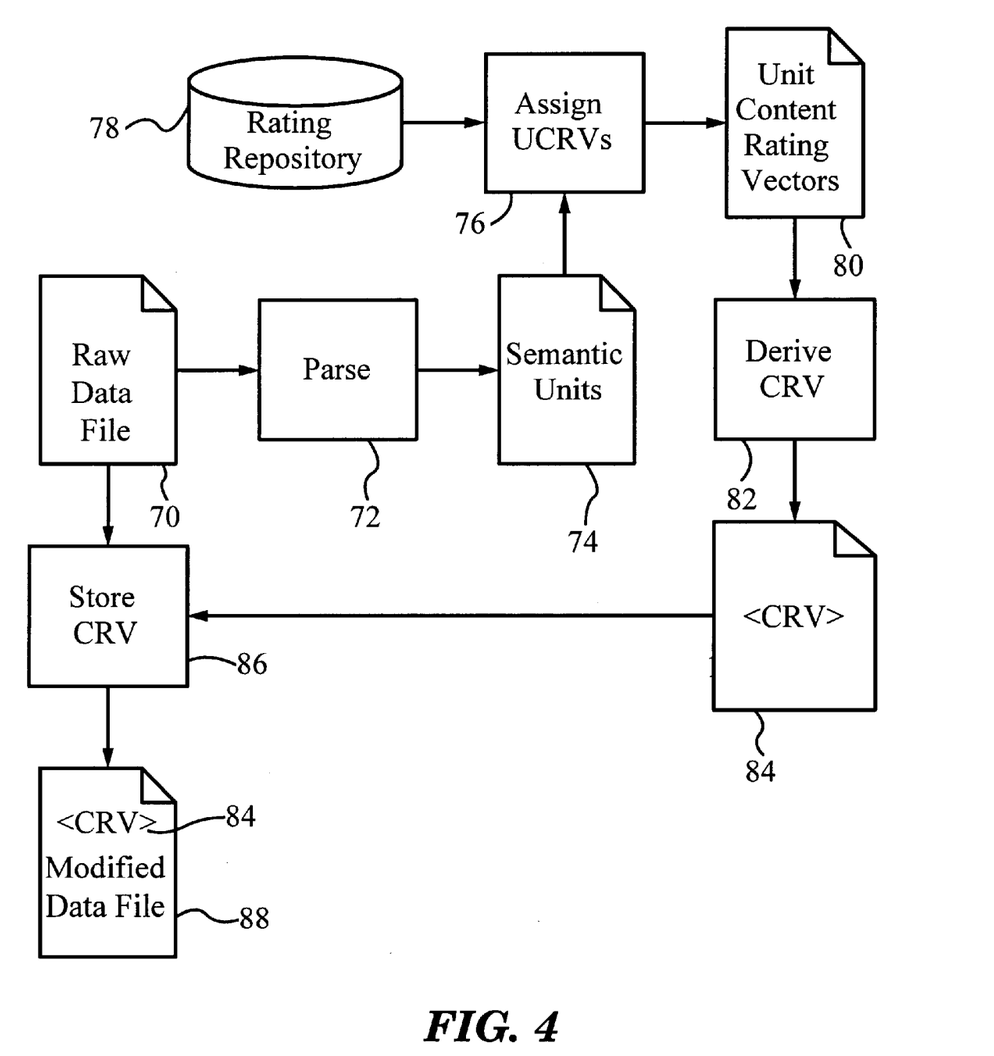
FIG. 4 is a block diagram of a method for automatically rating data files.

In most cases, Web sites do not contain CRVs, and the computer creating the index must generate a CRV for the site automatically. An automatic rating method for text files is illustrated in FIG. 4. Raw data file 70 is parsed in step 72 into semantic units 74, which may be words, phrases, or other text groupings. Parsing text data into words or phrases is a well-known technique. In step 76, unit content rating vectors (UCRVs) 80 are assigned to semantic units 74 using rating repository 78. Rating repository 78 contains entries and associated content rating vectors. The entries are semantic units similar to semantic units 74 into which raw data file 70 has been parsed. Each entry in the repository may have numerous associated content rating vectors for different contexts in which the word is used, determined by surrounding words in the text. The index-creation computer searches for entries in rating repository 78 equivalent to semantic units 74, and then assigns UCRVs 80 accordingly. Any system may be used for assigning UCRVs to the semantic units; the system chosen determines the types of semantic units, the rating repository, and the method for assigning UCRVs.

Next, a CRV 84 is derived for raw data file 70 in step 82. Any suitable method for deriving CRV 84 may be used. For example, CRV 84 might be a weighted average of UCRVs 80 or might take into account the fraction of UCRVs with a specific value. CRV 84 may then be stored in raw data file 70 in step 86 to produce a modified data file 88 containing CRV 84. Alternately, CRV 84 is not stored in raw data file 70, but only in the search engine index.

CRVs can also be generated automatically for non-text data files. For audio files, voice recognition software is used to generate a text file, which can be treated as described above. Similarly, image processing software can be used to recognize discrete objects within regions of image files. The discrete objects are the semantic units. A rating repository for image files contains discrete objects that can be recognized by the image processing software and associated ratings. UCRVs are assigned to regions of the image, and then a CRV is derived for the entire image file. In fact, a content rating vector can be generated for any type of data file that can be converted into semantic units, provided that an appropriate rating repository can be created. Data files containing multiple types of data, for example, audio and video, can receive separate CRVs for each data type, which may then be combined. Using this automatic method, the search engine can then create a CRV for every entry in its index. When it implements the method of FIG. 3, it simply obtains the CRV from its index.

Any content rating scheme may be used for defining content rating vectors, depending upon the type of information or objectionable content the user wishes to be alerted of. The preferred embodiment uses the RSAC on the Internet (RSACi) system developed by the Recreational Software Advisory Council (RSAC) and available at the RSAC Web site at http://www.rsac.org. The RSACi system provides content ratings on a scale of zero to four in four categories: nudity, sex, violence, and language. The system produces ratings tags that are compliant with the Platform for Internet Content Selection (PICS) tag system already in place, and that can easily be incorporated into existing HTML documents. In a preferred embodiment of the present invention, the CCRV is stored in the search result page by inserting the PICS tag into the HTML document header information.

Figure 5:
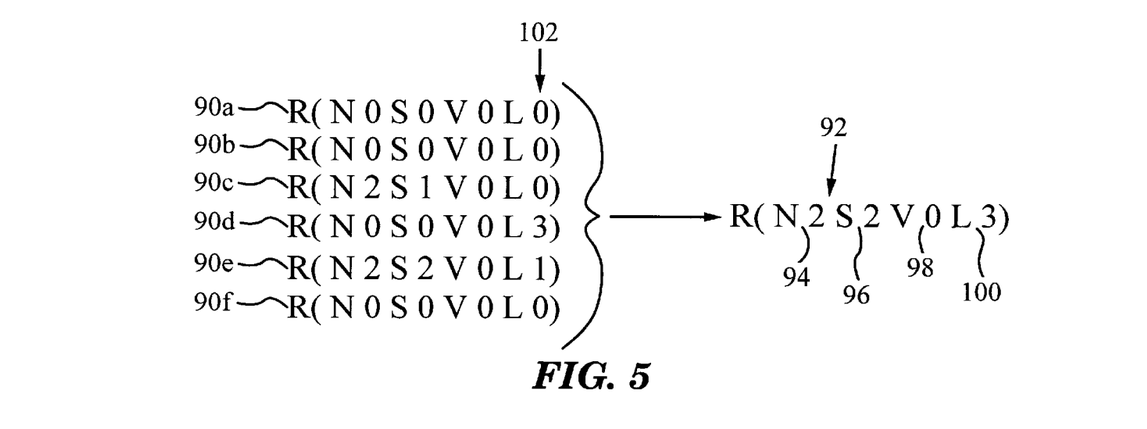
FIG. 5 is a schematic diagram of a method for deriving a composite content rating vector from content rating vectors.

FIG. 5 shows one embodiment of a composite content rating vector (CCRV) 92, in this case an RSACi content rating vector. CCRV 92 contains a set of components 94, 96, 98, and 100. Each category of the RSACi system is a component of CCRV 92: component 94 rates nudity, component 96 rates sex, component 98 rates violence, and component 100 rates language. CCRV 92 is derived from content rating vectors (CRVs) 90a through 90f associated with units of an SRP. Preferably, each component of CCRV 92 is derived from corresponding components of CRVs 90. For example, language component 100 is derived from corresponding language components 102 of CRVs 90.

FIG. 5 also illustrates one method for deriving a CCRV from CRVs for the units. This is the preferred method for the embodiment of FIG. 3, in which the units represent data files or Web pages. CRVs 90 represent degrees of objectionable content of Web pages referred to in an SRP containing CCRV 92. Each component of CCRV 92 is equal to the maximum value of corresponding components of CRVs 90. For example, the maximum value of corresponding language components 102 is 3, which occurs in CRV 90d, and so language component 100 is 3. Remaining components 94, 96, and 98 are calculated independently in a similar manner. This method gives the entire search result page the rating of the "worst" search result in each category. Even if only one result exceeds the user's browser content settings, a child should not be able to see the page. The objectionable content of one result cannot be mitigated by the presence of other harmless results.

Figure 6:
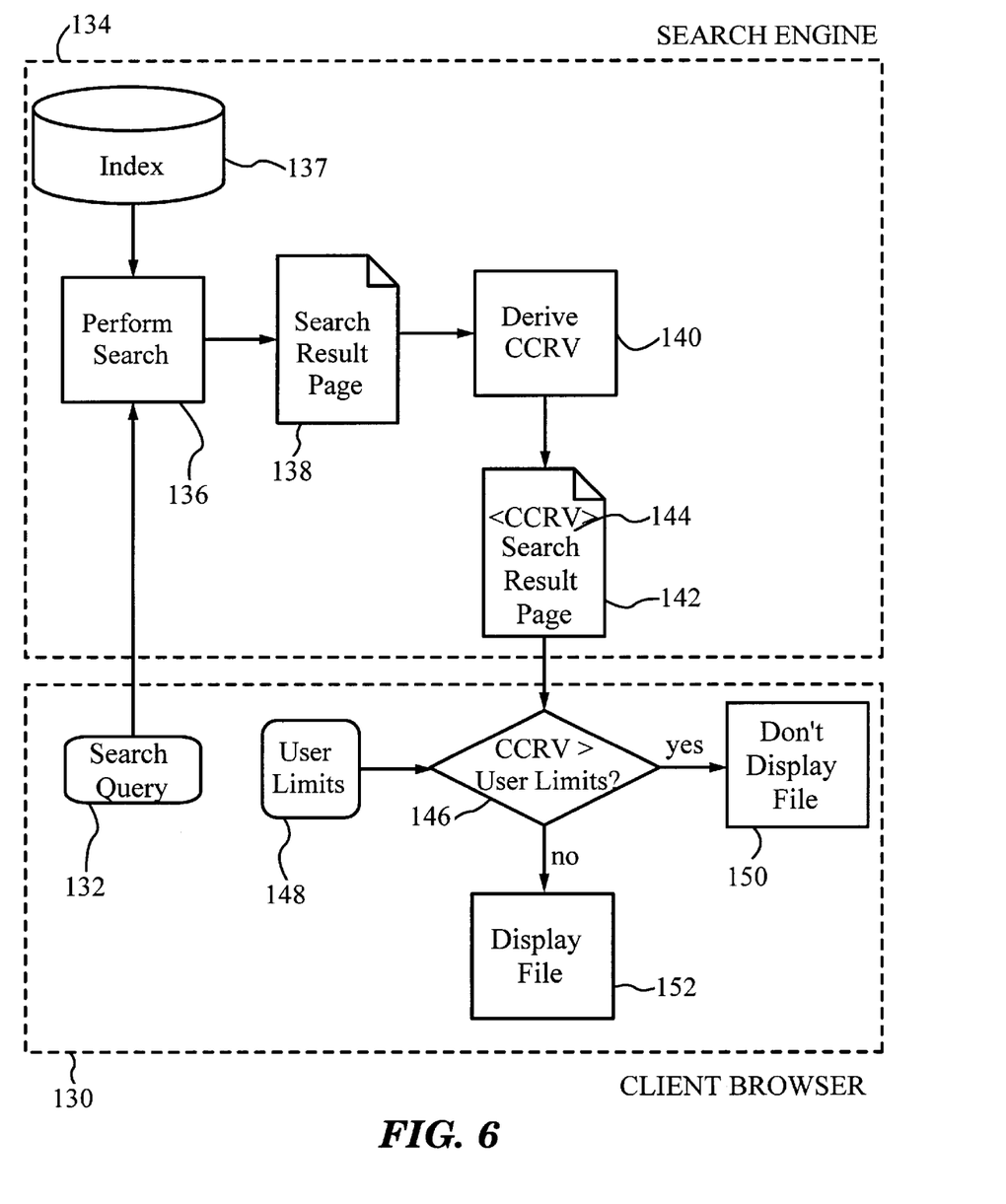
FIG. 6 is a block diagram of a system architecture for implementing a rating method.

The embodiment of the present invention for rating search result pages may be implemented in a distributed computer system in various ways. FIG. 6 is a block diagram showing one potential embodiment. A user of a client browser 130 sends a search query 132 to a search engine 134. Upon receiving search query 132, search engine 134 performs a search of index 137 in step 136 to generate a raw search result page 138. Search engine 134 derives a CCRV 144 for raw search result page 138 and stores it to produce rated search result page 142 in step 140. Search engine 134 sends rated SRP 142 to client browser 130, which uses CCRV 144 to determine whether or not to display SRP 142 to the user. In step 146, client browser 130 compares CCRV 144 with preset user limit values 148. If one component of CCRV 144 is greater than the corresponding preset user limit value 148, client browser 130 does not display SRP 142 (step 150). Alternately (step 152), it does display SRP 142.

Figure 7:
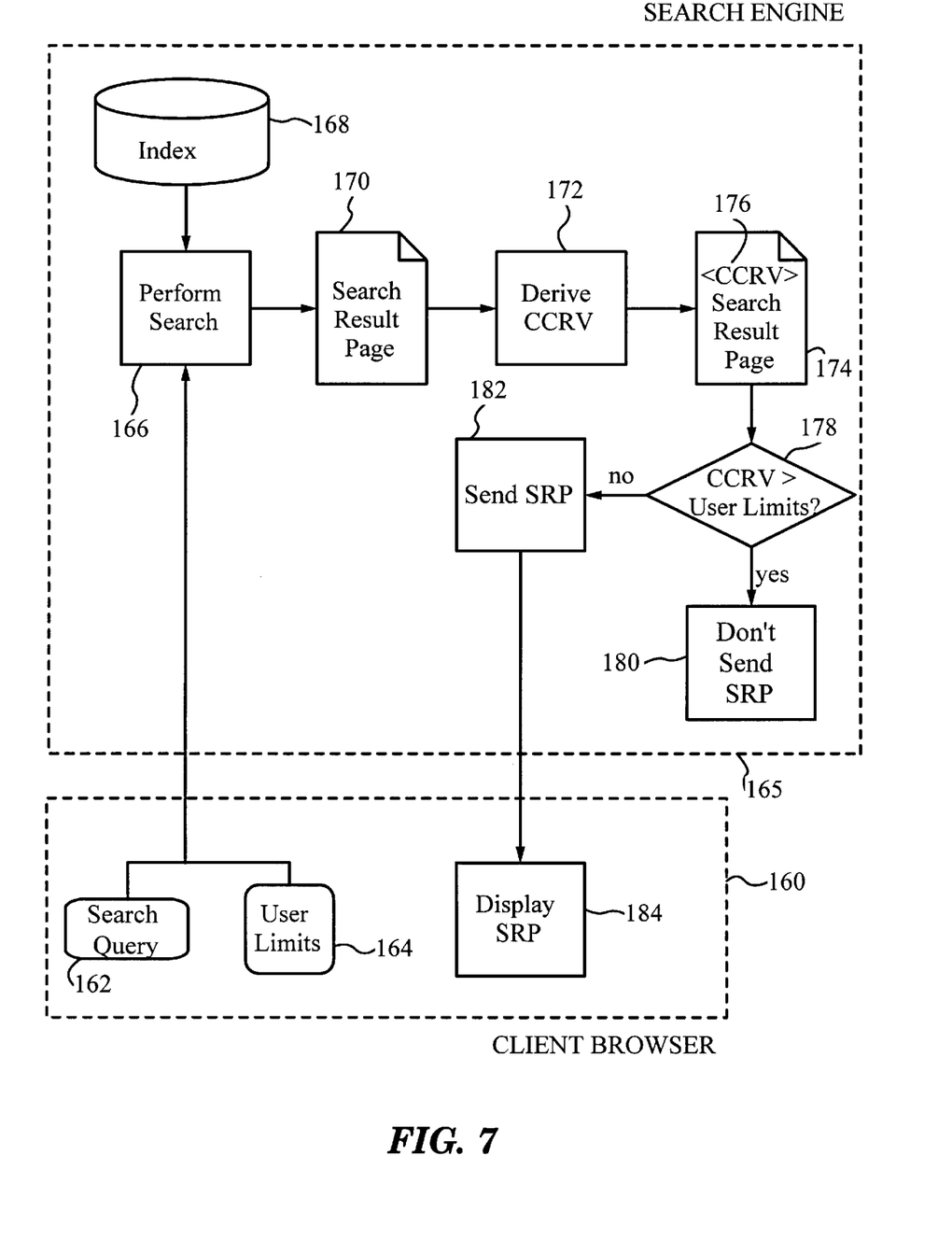
FIG. 7 is a block diagram of an alternate system architecture for implementing a rating method.

In an alternate embodiment shown in FIG. 7, the decision to display the search result page is made by the search engine rather than by the browser. In this case, client browser 160 sends both search query 162 and preset user limit values 164 to search engine 165. As before, search engine 165 performs a search (step 166) of index 168 to create raw search result page 170. It then derives a CCRV 176, which it stores to produce a rated search result page 174 in step 172. In step 178, search engine 165 determines whether or not to send rated SRP 174 to client browser 160 by comparing CCRV 176 with preset user limit values 164. If one component of CCRV 176 is too high (step 180), search engine 165 does not send SRP 174, instead sending an explanation of why it cannot send the page. Alternately (step 182), it does send SRP 174, and client browser 160 displays the page (step 184), because its rating is necessarily below preset user limit values 164.

The present invention also includes a method for providing rated hypermedia content. Raw hypermedia content is generated from a set of units, and the units contain data from external data files of any type, including text, audio, image, or a combination. Each unit contains content from a unique external data file. As used here, the term "external" refers to being external to the hypermedia content only. The external files may be stored in the same computer as the hypermedia content, or on a different computer. Content rating vectors are associated with the external data files and represent degrees to which the external data files are objectionable. A CCRV may be derived for the raw hypermedia content from the CRVs as described above for search result pages. The derived CCRV is stored in the raw hypermedia content to produce rated hypermedia content.

Figure 8:
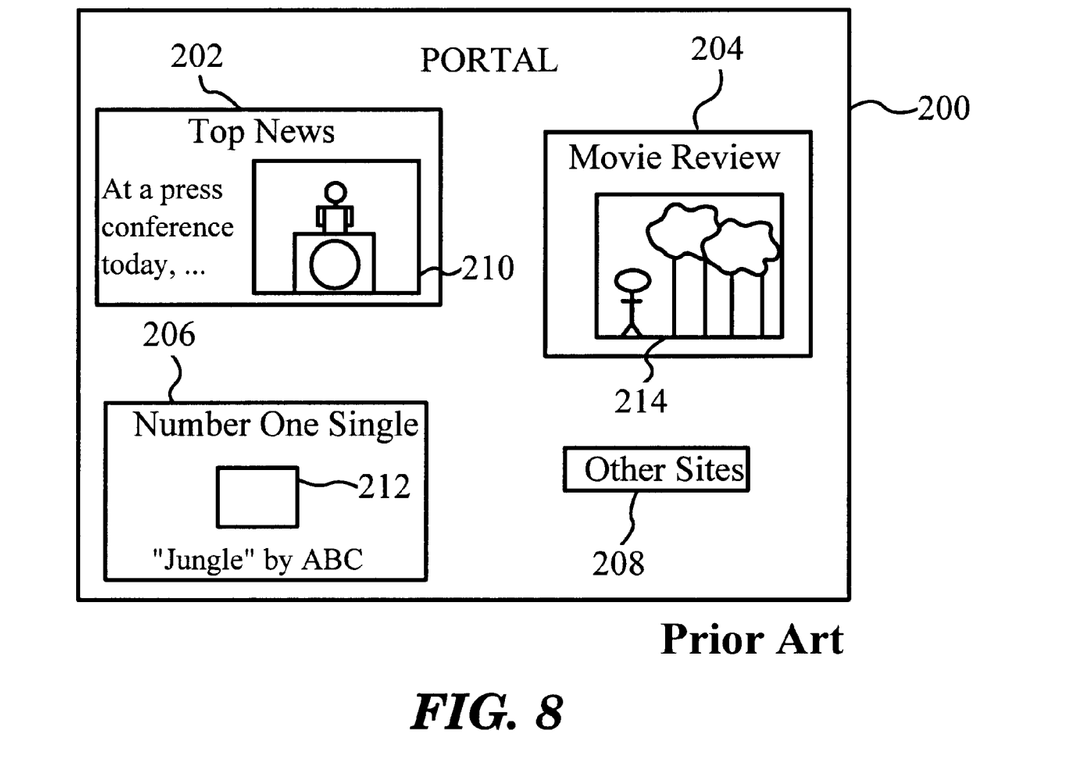
FIG. 8 is a schematic diagram of a Web portal site as known in the prior art.

FIG. 8 shows one example of hypermedia content, a Web portal site 200 as known in the prior art. Web portal site 200 gathers information from and contains hyperlinks to other sites, and is periodically updated to reflect changes in the hyperlinked sites. A user has set up site 200 to gather news headlines 202, a movie review 204, the weekly top music single 206, and other information 208. In addition to text data, site 200 also has an image file 210, an audio file 212, and a video file 214. Each individual piece, including links to other Web sites, has a content rating vector, or can be automatically rated to produce a content rating vector. The derived composite content rating vector is stored in portal site 200. It is quite likely that video file 214 and audio file 212 will have some objectionable content, and the derived CCRV reflects this.

In the example of FIG. 8, the user specifies what information and links will appear on the site, but does not know the exact content of the site until it is created. Alternately, a user can create a document by combining text with various files, all of which have known content. Rather than manually rating the entire composite page, which would be possible, the user can have a computer automatically rate the completed page based on the individual ratings for the units.

It will be clear to one skilled in the art that the above embodiments may be altered in many ways without departing from the scope of the invention. For example, in addition to deriving a composite content rating vector, the search engine might also remove objectionable search results, if it has the preset usr limit values. The search engine may also be able to obtain the preset user limit values without having them sent by the user with a search query. Accordingly, the scope of the invention should be determined by the following claims and their legal equivalents.

What is claimed is:

1. A computer-implemented method for providing an automatically rated search result page to a client machine, said method comprising the steps of:

a) automatically generating a raw search result page from a search query of said client machine, wherein said raw search result page comprises a set of units;

b) obtaining content rating vectors associated with said units, wherein said content rating vectors represent degrees of objectionable content;

c) deriving a composite content rating vector for said raw search result page from said content rating vectors;

d) storing said composite content rating vector in said raw search result page to produce said rated search result page; and e) transmitting said rated search result page over a computer network to said client machine.

2. The computer-implemented method of claim 1, wherein said units represent data files, and said content rating vectors represent degrees to which said data files are objectionable.

3. The computer-implemented method of claim 2, wherein said data files are selected from the group consisting of text, audio, and image files.

4. The computer-implemented method of claim 2, wherein said content rating vectors are obtained from said data files.

5. The computer-implemented method of claim 2, wherein said content rating vectors are obtained by automatically rating said data files for objectionable content.

6. The computer-implemented method of claim 1, wherein said composite content rating vector comprises a set of components, wherein each component in said set of components is derived from corresponding components of said content rating vectors.

7. The computer-implemented method of claim 6, wherein each component of said composite content rating vector is equal to a maximum value of said corresponding components of said content rating vectors.

8. A computer-implemented method for providing automatically rated hypermedia content, said method comprising the steps of:

a) automatically generating raw hypermedia content from a set of units, wherein said units contain data from a set of external data files;

b) obtaining content rating vectors associated with said external data files, wherein said content rating vectors represent degrees to which said external data files are objectionable;

c) deriving a composite content rating vector for said raw hypermedia content from said content rating vectors; and d) storing said composite content rating vector in said raw hypermedia content to produce said rated hypermedia content.

9. The computer-implemented method of claim 8, wherein said external data files are files selected from the group consisting of text, audio, and image.

10. The computer-implemented method of claim 8, wherein said content rating vectors are obtained from said external data files.

11. The computer-implemented method of claim 8, wherein said content rating vectors are obtained by automatically rating said external data files for objectionable content.

12. The computer-implemented method of claim 8, wherein said composite content rating vector comprises a set of components, wherein each component in said set of components is derived from corresponding components of said content rating vectors.

13. The computer-implemented method of claim 12, wherein each component of said composite content rating vector is equal to a maximum value of said corresponding components of said content rating vectors.

* * * * *